Figures 1, 2:
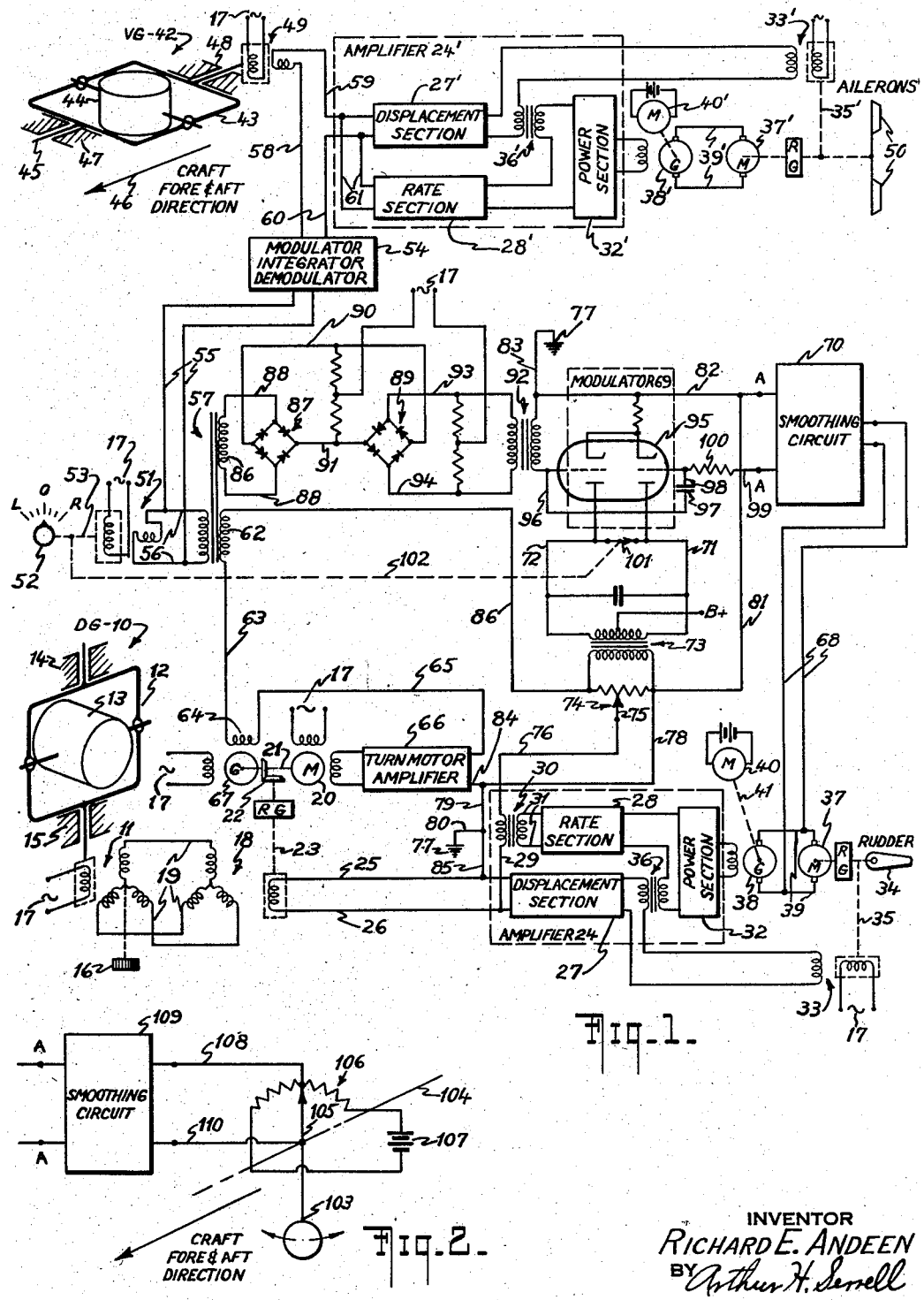

July 28, 1959                R. E. ANDEEN                2,896,883
                        AIRCRAFT AUTOMATIC PILOT
                          Filed Jan. 12, 1955

INVENTOR
RICHARD E. ANDEEN
BY Arthur H. Serrell
ATTORNEY

United States Patent Office 2,896,883
Patented July 28, 1959

2,896,883

AIRCRAFT AUTOMATIC PILOT

Richard E. Andeen, Great Neck, N.Y., assignor to Sperry Rand Corporation, a corporation of Delaware Application January 12, 1955, Serial No. 481,427

11 Claims. (Cl. 244—77)

This invention relates to an improvement in aircraft automatic pilots of the character shown and described in U.S. Letters Patent 2,567,922 issued September 18, 1951 to R. S. Brannin, P. Halpert and G. F. Jude.

The primary object of the present invention is to improve the stabilization of the rudder channel of a turn coordinating automatic pilot system of the character noted in the identified patent to obviate rudder pumping in the system when the craft is executing a command turn.

A further object is to accomplish this improved performance of the automatic pilot without affecting the gain or the torque gradient of the rudder axis controls of the system.

In flight tests at varying airspeeds, bank angles and turn rates of an aircraft, the occurrence of oscillation in the rudder channel of the turn coordinating pilot of the identified patent under some conditions of operation resulted in excessive pumping action of the rudder. Efforts to improve the stability of the system under these conditions by changing the elements in the circuit and modifying the dynamic characteristics of the modulator were not effective in eliminating the rudder pumping action. Other changes to correct the condition such as in the ratio of the gearing connections between the rudder servomotor and rudder and reducing the amplification of the circuit connecting aileron and rudder channels reduced the oscillations but also resulted in corresponding loss in the gain or torque gradient of the rudder axis controls of the automatic pilot.

The noted objects are attained in accordance with the present inventive concepts by utilizing a portion of the output of the circuit connecting aileron and rudder channels to modify the control signal to the rudder or heading servomotor from the rate channel of the automatic pilot. This provides sufficient lead in the input to the rudder servomotor to obtain stabilization of the rudder channel without affecting the gain or torque gradient of the automatic pilot. In the illustrated embodiment of the invention, the system includes a voltage divider element that receives the output of the aileron channel. The signal at the divider is utilized to correct the turn biasing signal initially established for the heading or rudder servomotor. A portion of the signal at the divider is employed to effect the desired stabilization of the system.

Other objects and features of the invention will more fully appear in the following description when read in connection with the accompanying drawing in which the subject matter is depicted in illustrative form.

In the drawings,

Fig. 1 is a diagrammatic view showing the elements of an automatic pilot constructed in accordance with the present inventive concepts and the interconnections for the elements as utilized in coordinating banked turns of an aircraft. Only the rudder and aileron control channels of the improved turn control automatic pilot are illustrated.

Fig. 2 is a similar view showing an individual side slip or skid detector element represented as a pendulum movable about the fore and aft axis of the craft with an appropriate pick-off. This element may be employed as an alternate in the system to the specific parallel circuitry connections to the input leads of the rudder servo means shown in Fig. 1 which serve a similar purpose. The automatic pilot system in the form of the invention shown in Fig. 1 is a closed electrical network. With the pendulum included in the automatic pilot, the system is closed in part through the frame of the aircraft between the rudder and the pendulum.

As shown in Fig. 1, the improved automatic pilot turn control system includes a directional reference element such as a directional gyro 10 having a synchro or pick-off 11 providing a signal in accordance with the displacement of the craft from a predetermined heading. Conventional parts of the illustrated directional reference are a vertical ring 12 and a rotor case 13. The ring 12 is mounted in the aircraft by means of suitable top and bottom bearings 14 and 15 which define an axis that is parallel to or coincident with the yaw or azimuth axis of the craft. The rotor case 13 supports the gyroscopic rotor element and is mounted on the ring 12 with freedom about a normally horizontal axis. When the craft turns about its azimuth axis or yaws, movement occurs between the same and the relatively fixed stabilized reference as defined by the elements 12 and 13 of the directional gyro. As shown, the reference includes a selsyn type signal transmitter or synchro single phase winding part is fixedly connected to the stabilized vertical ring 12. The three phase stator wound part of the pick-off 11 moves with the craft in turns and is adjustable in relation to the craft by a settable heading knob 16. Departure of the craft from the heading determined by the knob 16 results in an output from the synchro 11 whose magnitude depends on the extent of the departure and whose phase depends on the sense of the motion of the craft away from the established reference. A source of alternating current electrical energy 17 energizes the rotor part of the synchro 11. With the craft on the heading set by knob 16, the synchro 11 provides a null input to the automatic pilot system.

The described reference 10 and synchro 11 are in the rudder control channel of the improved automatic pilot. As shown, this channel further includes a second signal transmitter of the selsyn type indicated at 18. The three phase wound stator part of the synchro 18 is fixed to the craft and connected to the like part of synchro 11 by way of leads 19. The signal phase wound rotor part of the synchro 18 is driven by turn motor 20 through shafting 21, gearing 22, suitable reduction gearing indicated at RG, and shafting 23. The output of the data transmission system as provided by the two synchros 11 and 18 appears across the single phase rotor winding of the synchro 18. This winding provides the controlling input to rudder or heading servomotor or servo means of the system by way of an amplifier 24. Unless the craft is in a command turn, the synchro 18 provides no input to the rudder servo means inasmuch as the motor 20 is stationary under straight flight conditions. As shown, the leads 25 and 26 connect the synchro 18 and the displacement section 27 of the amplifier 24. The input signal to section 27 from the synchro 11 is in accordance with the displacement of the craft from a predetermined heading.

The automatic pilot includes means for providing a signal in accordance with the rate of change of the displacement signal. As shown, this means may be provided by a suitable rate network in the rate section 28 of the amplifier 24. The input to section 28 is obtained from displacement lead 26 by way of connecting lead 29, transformer 30 and leads 31. The power section 32 of amplifier 24 receives the combined outputs of the rate section 28 and displacement section 27 as well as a feedback signal from a third signal transmitter or synchro indicated at 33. As shown, the wound rotor of the synchro 33 is energized from source 17 and is connected to the rudder 34 of the craft by way of suitable shafting 35. The wound stator of synchro 33 is fixed to the craft and provides an output signal whose magnitude depends on the extent that the rudder 34 is moved from a streamline or null position. The phase of the signal from synchro 33 depends on the sense of the rudder movement. As represented in the drawing, the output signal of the displacement amplifier section 27 and the negative feed-back signal of synchro 33 provide the excitation for the primary winding of transformer 36. The output of transformer 36 with the output of the rate amplifier section 28 provides the operating input to the power section 32 of the amplifier 24. The output of the phase sensitive amplifier 24 of the automatic pilot rudder channel is employed to control the operation of a rudder servomotor 37 or servo means through the agency of a motor-generator set of the Ward-Leonard type. As shown, the field circuit of the direct current generator 38 of the set is energized by the output of the amplifier 24. The armature of generator 38 is connected by way of leads 39 to the armature of the driving servomotor 37 which is connected through suitable shafting and reduction gearing directly to the rudder 34 of the craft. The generator 38 of the Ward-Leonard set is driven at a constant speed by a motor 40 being connected thereto by shafting 41. The servo means or rudder servomotor 37 that controls the heading of the craft or its position in relation to its azimuth axis is operated in accordance with displacement signals from synchro 11, rate signals in accordance with output of rate section 28 and feed-back signals in accordance with the output of repeatback synchro 33. In straight and level flight with the rotor of synchro 18 stationary, the described automatic pilot system operates to maintain the craft on the course determined by the setting of knob 16. Any departure from the determined course is initially detected by the directional reference 10 of the system which provides a signal at synchro 11. This signal as modified by the signal of the rate section 28 and the feed-back signal is effective through the servomotor 37 to cause such movement of the rudder as to restore the craft to the determined course.

The improved automatic pilot system also includes a bank reference element to provide stabilization and control for the ailerons of the craft. As shown, the bank reference is provided by a gyro vertical 42 of conventional construction whose gimbal ring 43 universally supports a rotor case 44. The major axis of the rotor case 44 is parallel to or corresponds with the fore and aft axis 45 of the craft as represented by the arrow 46 noted as fore and aft craft direction. The minor axis of the rotor case 44 is normally horizontal and parallel to or coincident with the pitch or athwartship axis of the craft. As shown, the ring 43 may be mounted directly on the craft by means of spaced bearings 47 and 48. The rotor case 44 of the provided reference includes a gyroscopic rotor that is located to spin about a substantially vertical axis in a manner well known in the art. Any suitable means may be provided as an erecting device for the described type of gyro vertical.

The roll synchro 49 of the aileron channel controls for the improved automatic pilot has a wound rotor part that is fixedly connected to one of the trunnions of the ring 43 of the bank reference device. The stator part of the electrical synchro or pick-off 49 is fixed in relation to the craft. Under control of the bank reference the synchro 49 controlled thereby produces an output signal when the craft departs from a level condition about its fore and aft axis or banks. This signal is of a magnitude proportional to the banking angle. The phase of the signal is in accordance with the sense of the craft departure from a level condition about the roll axis 45. In this connection, it will be understood that the stabilized rotor part connected to ring 43 remains fixed in the position established by the reference gyro vertical 42. The part of the synchro movable with the craft changes position in relation to the stabilized rotor part to provide the described output. As shown, the alternating current source 17 is connected to the rotor winding of the synchro 49. The output signal from the stator winding of the synchro is proportional to the displacement of the craft from a level condition about its fore and aft axis.

The amplifier, the displacement, rate and power sections of the amplifier, the Ward-Leonard set, the servomotor, the feedback synchro, and the coupling transformer for the outputs of the feed-back synchro and displacement section of the amplifier provide elements in the aileron control channel of the autopilot that are similar to the correspondingly named elements in the described rudder control channel. The noted elements are accordingly identified herein by the same reference characters in primed condition indicated as amplifier 24', displacement section 27', rate section 28', power section 32', coupling transformer 36', generator 38', servomotor 37', synchro 33' and motor 40'. The aileron servomotor 37', in this instance, is directly connected by way of suitable shafting and reduction gearing to the ailerons 50 of the craft. The roll channel of the system operates through the ailerons to maintain the craft in a normal level condition about its fore and aft axis. The servo means for controlling the craft about its fore and after axis is operated by the displacement signal of the bank reference synchro 49, the output of the rate section 28 which is in accordance with the rate of change of the displacement signal, and the feed-back signal provided from the synchro 33'.

The elevator channel of the improved automatic pilot is not represented herein. It will be understood however that such a channel is provided in the system and that the same operates in a command turn by adjustment of the elevators of the craft so as to keep the vertical component of lift of the craft the same as in level flight. By this means, the relationship between bank angle, craft velocity, craft rate of turn and acceleration of gravity as set forth in detail in the hereinbefore identified patent is maintained and turns of the craft at different banking angles and airspeeds are coordinated.

The improved automatic pilot includes turn coordinating means operable to provide an initial biasing signal for both the rudder control channel and aileron control channel thereof. This signal in effect biases the banking servo means 37' to cause the craft to assume a fixed banking angle at the start of the turn. It also biases the heading or rudder servo means 37 to move the rudder and start the craft into the turn at an established turn rate. As shown in Fig. 1, the biasing signal is obtained from a signal generator or synchro 51 whose wound rotor is energized from signal source 17. The rotor of the synchro 51 is connected to the turn control knob 52 of the automatic pilot by suitable shafting 53. The index associated with the pointer on the knob 52 may be calibrated in either banking angle or rate of turn to the right and left of a null position. The extent of the movement of the knob from the null position by the human pilot is determinative of both the fixed bank angle and the established turn rate. In this regard, the fixed stator part of the synchro 51 is connected to the aileron channel of the automatic pilot in series relation to synchro 49 through a demodulator, integrator and modulator network indicated at 54 of suitable structure. As shown, the input to network 54 from synchro 51 is provided by a parallel circuit including leads 55 connected across the output leads 56 of the synchro. Output leads 56 also energize the primary of the transformer 57 of the turn control of the automatic pilot. Inasmuch as the signal of the synchro 51 is alternating in character, the demodulator stage of network 54 is effective to convert the signal to direct current, the integrating stage of the network 54 is effective to smooth or average the output of the demodulator stage, and the modulator stage is effective to restore the averaged signal from the integrator stage to an alternating current signal usable as an input to the amplifier 24' of the aileron channel of the system. The output of network 54 in series with synchro 49 feeds both displacement section 27' and rate sections 28' of amplifier 24'. Lead 58 connects the network 54 with one end on the stator winding of synchro 49. The other end of the synchro winding is connected to section 27' by way of lead 59. Lead 60 connects network 54 and section 27'. The rate section 28' of the amplifier 24' is fed by a parallel circuit across leads 59 and 60 provided by leads 61. The network 54 in the system functions to prevent any rate signals from entering the aileron control channel of the sysem with movement of the control knob 52 to a position to command a turn. In operation in a turn, the output of network 54 proportional to the signal from synchro 51 commanding the turn causes operation of the servo means 37' resulting in movement of the craft about its fore and aft axis. This motion continues until the signal from synchro 49 balances the input to the channel from the network 54 at which point the banked attitude of the turn is established. The automatic pilot functions in the turn to maintain the craft in the established attitude relative to its fore and aft axis.

The biasing signal for the rudder control channel of the automatic pilot establishes the turn rate of the craft. This signal is obtained from the synchro 18 whose rotor is driven by the turn motor 20 in accordance with the command signal of synchro 51. As shown, one of the secondary windings 62 of the transformer 57 feeds the signal of the synchro 51 by way of lead 63, generator winding 64, and lead 65 to a turn motor amplifier 66 whose output controls the operation of the motor 20. Motor 20 also drives a speed generator 67 whose output by way of winding 64 is also supplied as a feed-back to the amplifier so that the speed of the motor 20 is accurately proportional to the controlling input signal to the amplifier 66 from synchro 51. The biasing signal introduced to the rudder control channel through synchro 18 causes operation of the rudder and consequently initiates the turn of the banked craft in the sense determined by the setting of the command turn knob 52. In the turn, the rudder remains actuated by the system until the craft turns at the rate established by the turn motor and the signal from synchro 18 is balanced by actual movement of the craft about its yaw axis as reflected in motion of the stator of synchro 11 relative to the directional gyro stabilized rotor therof. When the craft is turning at the same rate as the established turn rate, the output of the transmission system including synchros 11 and 18 is null and the rudder returns to a streamline condition.

Inasmuch as the tangent of the bank angle of the craft is equal to the velocity of the craft times the turn rate divided by the acceleration of gravity, it is apparent that for a given bank angle the turn rate is dependent on the airspeed of the craft. A single definite rate of turn is required for a particular airspeed which is a variable factor. If the airspeed of the craft is such as not to correspond with the rate of turn established by the system for the fixed banking angle, the craft will side slip or skid during the turn. The improved automatic pilot includes signal means operable in a turn for sensing side slip or skid of the craft. In the form of the invention shown in Fig. 1, this means is constituted of a parallel circuit including leads 68 connected across leads 39 carrying the output of the generator 38 in the rudder channel of the automatic pilot. This circuit is responsive to a persistent input to the heading servo means 37 and provides a measure of the turn rate error in the system wherein the synchros 11 and 18 remain in temporarily unmatched condition so as to provide a rudder operating signal. The cause of this unmatched condition is due to the fact that the output of synchro 11 which reflects the rate at which the craft is actually turning is different from the output of the synchro 18 which reflects the turn rate set up by the turn knob 52 to control the operation of motor 20. The synchros 11 and 18 are differentially arranged to compare the position of the respective rotors thereof. When the rotors are not moving together at the same rate and in positional agreement, the synchros 11 and 18 together produce a single output that is in accordance with the angular displacement of the rotors thereof from positional agreement. This output when continuous provides a persistent input to the heading servo means 37. The parallel circuit including leads 68 are at the servo motor input and accordingly the signal thereat is indicative of the fact that the craft is turning in a side slip or skid condition. To reduce the turn error to zero and thereby reestablish coordination in the turn, the improved automatic pilot includes means for apportioning the signal of the turn error sensing means to provide an input to the rate section 28 and to provide an input to the turn rate biasing signal means. The second of the noted inputs operates to change the speed of the motor 20 and coordinates the initially established turn rate with the craft's actual turn rate for the given banking angle and at the actual air-speed of the craft. With this condition restored, the signal from the data transmission system including synchros 11 and 18 is null and the rudder 34 returns to a streamline condition.

The correction for the turn biasing signal is obtained from the output of a modulator 69 whose input is provided by the output of a suitable smoothing or integrating network 70 that receives the turn error signal by way of leads 68. The smoothing circuit 70 filters the direct current signal of the turn error sensing means and the modulator 69 converts the same to a proportional alternating current signal fed by either of the plate leads 71, 72 to the center tapped primary winding of transformer 73. As shown, the center tap connecting lead to the primary of transformer 73 is energized B+. The secondary of the transformer 73 carrying the output of the modulator 69 is connected across a voltage divider or potentiometer 74 with an adjustable arm 75 connected by lead 76, to the lead 26 of the rudder control channel by way of the primary transformer winding to the rate section 28 of amplifier 24 and lead 29. One side of the divider 74 is connected to ground 77 by way of leads 78, 79 and 80 as well as by leads 81, 82 and 83. Grounded leads 78 and 79 are connected to the turn motor amplifier 66 by way of lead 84. Lead 85 connects the rudder channel lead 25 to ground 77. The portion of the divider to the left of the adjustable arm 75 is connected in the input circuit to the amplifier 66 by way of lead 86 to one end of the secondary winding 62 of the transformer 57. The output of the modulator 69 is utilized to correct the signal to amplifier 66 from synchro 51 and thus change the speed of operation of the turn motor 20. This coordinates the initially established turn rate set up for the craft with its actual turn rate and permits the rudder to return to a streamline condition.

The portion of the voltage divider signal to the right of the arm or slider 75 provides an input to the rate signal means of the rudder channel of the automatic pilot, in this instance, provided by the rate section 28. By thusly changing the output of the rate section of the rudder channel, the operations of the portion of the system including the side slip or skid sensing means, the amplifier 66 and turn motor 20 are stabilized in such a manner as to obviate rudder pumping. This result is further attained without affecting the gain or torque gradient of the rudder axis controls of the automatic pilot.

As shown in Fig. 1, the side slip or skid signal of the system is preferably adjusted in accordance with the bank angle set up for the craft in the turn before apportionment in the manner described. The means utilized to effect this adjustment is provided by the modulator 69 which in addition to receiving the output from smoothing circuit 70 receives an input from synchro 51 that is proportional to the bank signal. In this connection, the other secondary winding 86 of the transformer 57 provides a signal of amplitude and phase corresponding to the bank angle and sense of bank, respectively, of the craft. Winding 86 is connected to a full wave rectifier 87 by way of leads 88, the rectifier converting the alternating input thereto from winding 86 to a direct current signal of a magnitude corresponding to the bank angle and of constant polarity. The output of rectifier 87 is applied across a ring modulator 89 including a rectifier bridge of known type supplied with alternating current from source 17. Leads 90 and 91 connect the rectifier 87 and ring modulator 89. Ring modulator 89 is coupled to modulator 69 by way of transformer 92. Leads 93 and 94 connect the modulator 89 and the primary of the transformer 92. The output of transformer 92 represents an alternating current signal of an amplitude corresponding to the angle of bank of the craft with a constant phase. This signal is fed directly to one of the grids of the compound triode 95 of the modulator 69 and is fed to the other grid of the triode by way of lead 96, condenser 97 and lead 98. As shown, the turn error direct current signal from smoothing circuit is applied to one of the grids of the triode 95 by way of lead 99 and resistor 100. The other lead to circuit 70 is connected to ground 77 by way of leads 82 and 83. A cathode resistor is located between the cathodes of the triode 95 and the lead 82. The modulator 69 functions as a means for adjusting the signal of the side slip or skid signal means in accordance with the banking angle of the craft. The output of modulator 69 by way of transformer 73 is apportioned in the manner heretofore set forth by the voltage divider 74. A switch 101 mechanically coupled to knob 52 by shafting 102 shorts the plate leads 71, 72 of the modulator 69 so there is no output therefrom unless the knob 52 is set to command a turn. The switch 101 is shown in its closed position in the drawing.

In lieu of the turn error signal sensing means provided by the system as shown in Fig. 1 by the generator 38 and leads 68, an alternative arrangement may be employed in which leads 68 are dispensed with and a pendulum and synchro substituted therefor. As shown in Fig. 2, the side slip or skid sensing means is provided by a pendulum 103 supported on the craft with freedom about its fore and aft axis 104. Pendulum 103 controls the slider 105 of a center-tapped potentiometer type synchro 106 whose ends are connected across a battery 107. Lead 108 connects the centertap position of the potentiometer which is fixed in relation to the craft to a smoothing circuit 109 similar to the smoothing circuit 70. Lead 110 provides the other input leads to the circuit 109 from the slider arm 105. The output of the circuit 109 may be connected at point A—A in Fig. 1 to replace that provided by the generator 38, leads 68 and smoothing circuit 70. In a turn that is coordinated the pendulum will follow the midpoint of the synchro 106 as the same becomes inclined with banking of the craft. With a departure from this condition, the synchro 106 senses the side slip or skid of the craft, and provides a direct current signal output whose magnitude depends on the extent of the departure and whose polarity depends on the sense of the departure. The automatic pilot system in this form of the invention is closed from the rudder 34 through the frame of the craft to the pendulum 103.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In an aircraft automatic pilot with a directional reference and synchro providing a signal in accordance with the displacement of the craft from a predetermined heading, means providing a signal in accordance with the rate of change of the displacement signal, servo means for controlling the heading of the craft operated by the signals of the synchro and rate signal means, a bank reference and synchro providing a signal in accordance with the displacement of the craft from a level condition about its fore and aft axis, and servo means for controlling the craft about its fore and aft axis operated by the signal of the bank reference synchro; the combination of, means for providing a signal for biasing the banking servo means and heading servo means to initiate a turn of the craft at an established rate and a fixed banking angle, signal means operable in the turn for sensing side slip or skid of the craft, and means for apportioning the signal of said side slip or skid sensing means to provide an input to the rate signal means and an input to the turn rate biasing signal means and thereby coordinate the initially established turn rate of the craft with its actual turn rate.

2. In an aircraft automatic pilot with a directional reference and synchro providing a signal in accordance with the displacement of the craft from a predetermined heading, means providing a signal in accordance with the rate of change of the displacement signal, servo means for controlling the heading of the craft operated by the signals of the synchro and rate signal means, a bank reference and synchro providing a signal in accordance with the displacement of the craft from a level condition about its fore and aft axis, and servo means for controlling the craft about its fore and aft axis operated by the signal of the bank reference synchro; the combination of, means for providing a signal for biasing the banking servo means and heading servo means to initiate a turn of the craft at an established rate and at a fixed banking angle, turn error sensing means providing a signal in accordance with a persistent input to the heading servo means, and means for apportioning the signal of said turn error sensing means to provide an input to the rate signal means and an input to the turn rate biasing signal means and thereby coordinate the initially established turn rate of the craft with its acual turn rate.

3. In an aircraft automatic pilot with a directional reference and synchro providing a signal in accordance with the displacement of the craft from a predetermined heading, means providing a signal in accordance with the rate of change of the displacement signal, servo means for controlling the heading of the craft operated by the signals of the synchro and rate signal means, a bank reference and synchro providing a signal in accordance with the displacement of the craft from a level condition about its fore and aft axis, and servo means for controlling the craft about its fore and aft axis operated by the signal of the bank reference synchro; the combination of, means for providing a signal for biasing the banking servo means and heading servo means to initiate a turn of the craft at an established rate and at a fixed banking angle, a pendulum with freedom about the fore and aft axis of the craft operating a synchro providing a signal in accordance with side slip or skid of the craft during the turn, and means for apportioning the signal of said pendulum operated synchro to provide an input to the rate signal means and an input to the turn rate biasing signal means and thereby coordinate the initially established turn rate of the craft with its actual turn rate.

4. In an aircraft automatic pilot with a directional reference and synchro providing a signal in accordance with the displacement of the craft from a predetermined heading, means providing a signal in accordance with the rate of change of the displacement signal, servo means for controlling the heading of the craft operated by the signals of the synchro and rate signal means, a bank reference and synchro providing a signal in accordance with the displacement of the craft from a level condition about its fore and aft axis, and servo means for controlling the craft about its fore and aft axis operated by the signal of the bank reference synchro; the combination of, means for providing a signal for biasing the banking servo means and heading servo means to initiate a turn of the craft at an established rate and at a fixed banking angle, signal means operable in the turn for sensing side slip or skid of the craft, means for adjusting the signal of said side slip or skid sensing means in accordance with the banking angle of the craft, and means for apportioning the signal of said adjusting means to provide an input to the rate signal means and an input to the turn rate biasing signal means and thereby coordinate the initially established turn rate of the craft with its actual turn rate.

5. In an aircraft automatic pilot with a directional reference and synchro providing a signal accordance with the displacement of the craft from a predetermined heading, means providing a signal in accordance with the rate of change of the displacement signal, servo means for controlling the heading of the craft operated by the signals of the synchro and rate signal means, a bank reference and synchro providing a signal accordance with the displacement of the craft from a level condition about its fore and aft axis, and servo means for controlling the craft about its fore and aft axis operated by the signal of the bank reference synchro; the combination of, means for providing a signal for biasing the banking servo means and heading servo means to initiate a turn of the craft at an established rate and at a fixed banking angle, turn error sensing means providing a signal in accordance with a persistent input to the heading servo means, means for adjusting the signal of said turn error sensing means in accordance with the banking angle of the craft, and means for apportioning the signal of said adjusting means to provide an input to the rate signal means and an input to the turn rate biasing signal means and thereby coordinate the initially established turn rate of the craft with its actual turn rate.

6. In an aircraft automatic pilot with a directional reference and synchro providing a signal in accordance with the displacement of the craft from a predetermined heading, means providing a signal in accordance with the rate of change of the displacement signal, servo means for controlling the heading of the craft operated by the signals of the synchro and rate signal means, a bank reference and synchro providing a signal in accordance with the displacement of the craft from a level condition about its fore and aft axis, and servo means for controlling the craft about its fore and aft axis operated by the signal of the bank reference synchro; the combination of, means for providing a signal for biasing the banking servo means and heading servo means to initiate a turn of the craft at an established rate and at a fixed banking angle, a pendulum with freedom about the fore and aft axis of the craft operating a synchro providing a signal in accordance with side slip or skid of the craft during the turn, means for adjusting the signal of the pendulum operated synchro in accordance with the banking angle of the craft, and means for apportioning the signal of said adjusting means to provide an input to the rate signal means and an input to the turn rate biasing signal means and thereby coordinate the initially established turn rate of the craft with its actual turn rate.

7. In an aircraft automatic pilot with a directional reference and synchro providing a signal in accordance with the displacement of the craft from a predetermined heading, means providing a signal in accordance with the rate of change of the displacement signal, servo means for controlling the heading of the craft operated by the signals of the synchro and rate signal means, a bank reference and synchro providing a signal in accordance with the displacement of the craft from a level condition about its fore and aft axis, and servo means for controlling the craft about its fore and aft axis operated by the signal of the bank reference synchro; the combination of, manually settable turn control means providing a signal for operating the banking servo means and heading servo means to initiate a turn of the craft at an established rate and at a fixed banking angle, signal means operable in the turn for sensing side slip or skid of the craft, means for adjusting the signal of said side slip or skid sensing means in accordance with the banking angle of the craft, and a voltage divider for the signal of said adjusting means connected to provide an input to the rate signal means and an input to the settable turn control means and thereby coordinate the initially established turn rate of the craft with its actual turn rate.

8. In an aircraft automatic pilot with a directional reference and synchro providing a signal in accordance with the displacement of the craft from a predetermined heading, means providing a signal in accordance with the rate of change of the displacement signal, servo means for controlling the heading of the craft operated by the signals of the synchro and rate signal means, a bank reference and synchro providing a signal in accordance with the displacement of the craft from a level condition about its fore and aft axis, and servo means for controlling the craft about its fore and aft axis operated by the signal of the bank reference synchro; the combination of, manually settable turn control means providing a signal for operating the banking servo means and heading servo means to initiate a turn of the craft at an established and at a fixed banking angle, turn rate error sensing means providing a signal in accordance with a persistent input to the heading servo means, means for adjusting the signal of said turn error sensing means in accordance with the banking angle of the craft, and a voltage divider for the signal of said adjusting means connected to provide an input to the rate signal means and an input to the settable turn control means and thereby coordinate the initially established turn rate of the craft with its actual turn rate.

9. In an aircraft automatic pilot with a directional reference and synchro providing a signal in accordance with the displacement of the craft from a predetermined heading, means providing a signal in accordance with the rate of change of the displacement signal, servo means for controlling the heading of the craft operated by the signals of the synchro and rate signal means, a bank reference and synchro providing a signal in accordance with the displacement of the craft from a level condition about its fore and aft axis, and servo means for controlling the craft about its fore and aft axis operated by the signal of the bank reference synchro; the combination of, manually settable turn control means providing a signal for operating the banking servo means and heading servo means to initiate a turn of the craft at an established rate and at a fixed banking angle, a pendulum with freedom about the fore and aft axis of the craft operating a synchro providing a signal in accordance with side slip or skid of the craft during the turn, means for adjusting the signal of the pendulum operated synchro in accordance with the banking angle of the craft, and a voltage divider for the signal of said adjusting means connected to provide an input to the rate signal means and an input to the settable turn control means and thereby coordinate the initially established turn rate of the craft with its actual turn rate.

10. In an aircraft automatic pilot having a heading servo means, means for controlling said heading servo means in accordance with a signal proportional to the displacement of the craft from a heading reference device and a signal proportional to the rate of change of the displacement signal, means for providing a signal for biasing the heading servo means to initiate a turn of the craft at an established rate, signal means operable in the turn for sensing side slip or skid of the craft, and means for apportioning the signal of said side slip or skid sensing means to provide an input to the portion of said controlling means providing a rate signal and an input to the turn rate establishing means to coordinate the established and actual turn rates.

11. A device of the character claimed in claim 10, in which said apportioning means is an adjustable voltage divider.

References Cited in the file of this patent

UNITED STATES PATENTS

| | | |
|---|---|---|
| 2,464,629 | Young | Mar. 15, 1949 |
| 2,567,922 | Brannin et al. | Sept. 18, 1951 |
| 2,586,034 | Halpert | Feb. 19, 1952 |